US009634771B2

(12) United States Patent
Morris et al.

(10) Patent No.: US 9,634,771 B2
(45) Date of Patent: Apr. 25, 2017

(54) OPTICAL CONNECTOR INTERCONNECTION SYSTEM AND METHOD

(71) Applicant: HEWLETT-PACKARD DEVELOPMENT COMPANY, L.P., Houston, TX (US)

(72) Inventors: Terrel Morris, Plano, TX (US); Paul Kessler Rosenberg, Palo Alto, CA (US); Michael Renne Ty Tan, Palo Alto, CA (US); Gary Gostin, Plano, TX (US); Eric Peterson, Redman, WA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/922,019

(22) Filed: Oct. 23, 2015

(65) Prior Publication Data
US 2016/0050027 A1 Feb. 18, 2016

Related U.S. Application Data

(62) Division of application No. 13/126,837, filed as application No. PCT/US2008/082158 on Oct. 31, 2008, now Pat. No. 9,207,416.

(51) Int. Cl.
H04B 10/80 (2013.01)
G02B 6/12 (2006.01)
(Continued)

(52) U.S. Cl.
CPC ....... H04B 10/801 (2013.01); G02B 6/12004 (2013.01); G02B 6/43 (2013.01);
(Continued)

(58) Field of Classification Search
CPC .... H04B 10/801; G02B 6/43; G02B 6/12004; G06F 13/426
See application file for complete search history.

(56) References Cited

U.S. PATENT DOCUMENTS

| 5,113,403 A | 5/1992 | Block et al. |
| 5,245,680 A * | 9/1993 | Sauter ............. G02B 6/43 385/24 |

(Continued)

FOREIGN PATENT DOCUMENTS

| JP | 04-301933 | 10/1992 |
| JP | 09-312484 A | 12/1997 |

OTHER PUBLICATIONS

International Preliminary Report on Patentability received in PCT Application No. PCT/US2008/082158, May 12, 2011, 6 pages.

(Continued)

Primary Examiner — Ryan Lepisto
Assistant Examiner — Erin Chiem
(74) Attorney, Agent, or Firm — Thorpe North & Western, LLP

(57) ABSTRACT

A method for connecting adjacent computing board devices. A source computing board may be provided. An optical engine attaches to the source computing board. A plurality of source optical connectors couples to the optical engine. A first optical connector may be positioned at a location on the source computing board for a first preset type of computing component on an adjacent computing board. A second optical connector may be positioned at a fixed coordinate related to the first optical connector on the source computing board.

4 Claims, 12 Drawing Sheets

(51) Int. Cl.
*G02B 6/43* (2006.01)
*G06F 13/42* (2006.01)

(52) U.S. Cl.
CPC .......... *G06F 13/426* (2013.01); *H04B 10/803* (2013.01); *Y10T 29/49117* (2015.01)

(56) References Cited

U.S. PATENT DOCUMENTS

| | | | | |
|---|---|---|---|---|
| 5,362,961 A * | 11/1994 | Hamanaka | ........... | G02B 3/0006 250/216 |
| 5,818,618 A * | 10/1998 | Eastmond | ................ | G02B 6/43 398/118 |
| 5,923,451 A * | 7/1999 | Karstensen | .............. | G02B 6/43 398/135 |
| 6,038,048 A | 3/2000 | Harris et al. | | |
| 6,038,355 A * | 3/2000 | Bishop | ................. | G02B 6/2817 385/14 |
| 6,055,099 A * | 4/2000 | Webb | ....................... | G02B 6/43 359/435 |
| 6,470,112 B2 * | 10/2002 | Okayama | ............ | H04B 10/801 385/24 |
| 6,650,844 B1 * | 11/2003 | Davies | .................... | G02B 6/43 385/14 |
| 6,872,007 B2 * | 3/2005 | Botham | ................... | G02B 6/43 385/53 |
| 6,970,649 B2 * | 11/2005 | DeCusatis | ............... | H04J 14/02 398/187 |
| 7,039,265 B2 | 5/2006 | Levy et al. | | |
| 7,120,327 B2 * | 10/2006 | Bozso | ................... | G06F 13/409 385/15 |
| 7,251,388 B2 | 7/2007 | Morris et al. | | |
| 2002/0021855 A1 * | 2/2002 | Kim | ........................ | G02B 6/43 385/15 |
| 2003/0210869 A1 | 11/2003 | Doorn | | |
| 2004/0057669 A1 | 3/2004 | Botham | | |
| 2004/0234232 A1 | 11/2004 | Levy et al. | | |
| 2005/0036789 A1 | 2/2005 | Bjorndahl et al. | | |
| 2009/0097851 A1 * | 4/2009 | Tan | ........................ | H04J 14/02 398/82 |

OTHER PUBLICATIONS

International Search Report & Written Opinion received in PCT Application No. PCT/US2008/082158, Jun. 19, 2009, 11 pages.

* cited by examiner

| Connection Type | Left Connection | Right Connection |
|---|---|---|
| Memory | Used | |
| I/O | | Used |
| CPU | | Used |
| Comm Hub | | Used |
| Graphics | Used | |

FIG. 2D

OPTICAL CONNECTOR INTERCONNECTION SYSTEM AND METHOD

This patent application is a divisional application of U.S. patent application Ser. No. 13/126,837, filed Aug. 1, 2011, titled "OPTICAL CONNECTOR INTERCONNECTION SYSTEM AND METHOD," which is a national stage application of PCT Application Ser. No. PCT/US2008/082158, filed Oct. 31, 2008, the relevant contents of each of these applications herein being incorporated by reference.

BACKGROUND

Interconnects are used between components and devices on printed circuit boards (PCBs) to allow components and devices to communicate with each other as part of a larger computer system. PCBs are often stacked together on edge as computer cards or blades connected to a computer chassis to provide a greater density within a limited space.

Interconnects allow devices, components, or blades in a computer system to communicate with each other using electrical or optical signals. Often PCBs or computer boards of different types are positioned adjacent to each other and the components on those boards are electrically connected to each other. Different board types may be interchanged with each other and placed adjacent to other different board types.

However, such interconnects between computing boards or blades can often use a significant amount of switching or routing to determine how the information being received should be routed. In addition, protocol or format translations may also take place to convert information into the formats necessary for the receiving components. The added complexity of the electronic switching components and routing can add a significant amount of cost to communication systems for such interconnects.

BRIEF DESCRIPTION OF THE DRAWINGS

FIG. 2D is a table illustrating that once a connector is used on one side of the board, the opposing connector with the same signal cannot be used on the other side of the board, in an embodiment;

DETAILED DESCRIPTION OF EXAMPLE EMBODIMENTS

Figure 1A:
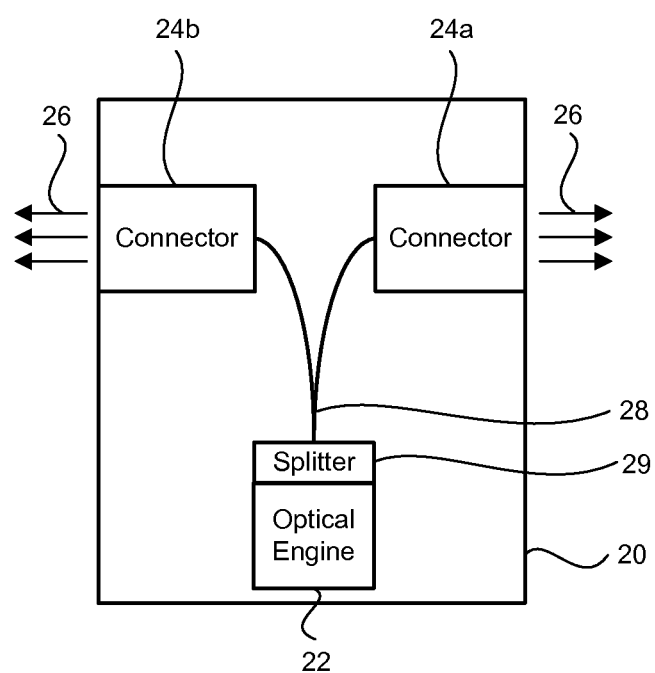
FIG. 1A illustrates an embodiment of a system for connecting adjacent computing board devices.

Alterations and further modifications of the inventive features illustrated herein, and additional applications of the principles of the inventions as illustrated herein, which would occur to one skilled in the relevant art and having possession of this disclosure, are to be considered within the scope of the invention. The same reference numerals in different drawings represent the same element. Unless otherwise indicated, coupling refers to electrical or optical coupling.

FIG. 1A illustrates an embodiment of a system for connecting adjacent computing devices mounted on computing boards. The system can include a source computing board 20, and the source computing board may be a printed circuit board (PCB). An optical engine 22 can be attached to the source computing board. The optical engine can be connected to a computing device or the optical engine may independently transmit optical signals.

One or more optical connectors 24a and 24b can be coupled to the optical engine 22 via optical conduits 28 and/or an optical splitter 29. The optical conduits can be fiber optics, hollow core wave guides, or other known optical conduits. In addition, the optical conduits can carry optical signals 26. In addition, the optical conduits can carry optical signals 26. The optical signal being provided to both optical connectors will be the same signal from the optical engine but the optical signal will be split between the two or more connectors using the optical splitter 29. The optical splitter can be part of optical engine or the optical engine can be a separate module.

The optical connectors can be positioned at fixed coordinates on the source computing board. The fixed coordinate position can be defined as a preset location for a specific type of computing communication connection. This means an adjacent computing board in proximity to the source computing board can be configured to receive the optical signals output by the source computing board.

Figure 1B:
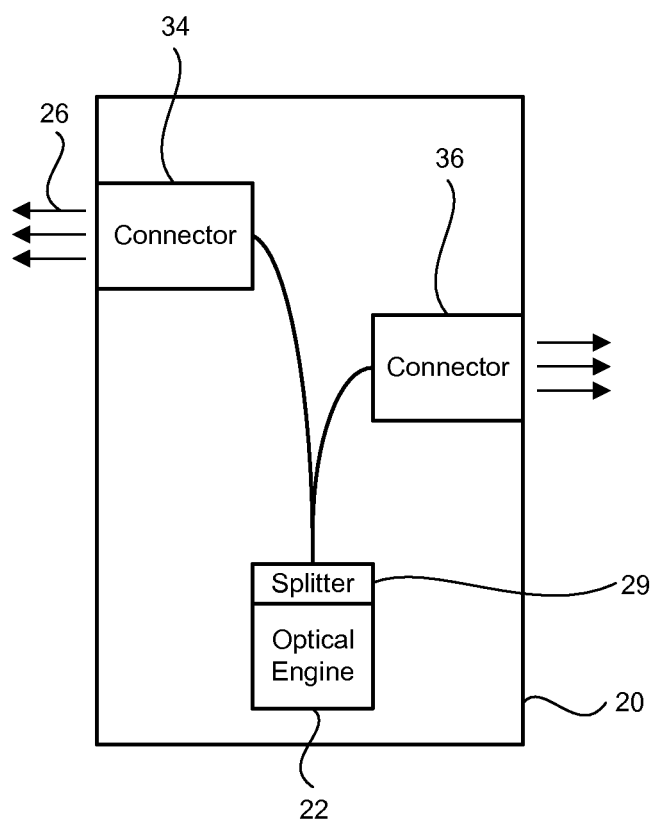
FIG. 1B an embodiment of a system for connecting adjacent computing board devices using connectors having fixed coordinate positions.

FIG. 1B further illustrates the varying positioning that can be provided using fixed coordinates. In particular, a first connector 34 can be located on one side of a board at a first preset, fixed location. Then a second connector 36 can be located on the second side of the board at a defined offset from the first connector. This means that a defined communication component type (e.g., memory, I/O, CPU (Central Processing Unit), etc.) can connect to the first side of the computing board at the first location 34 but if another type of device is installed adjacent to the board 20, then the incorrect communication port will not physically line up with the connector. For example, a memory board that is place adjacent to the board 20 of FIG. 1B may be configured to send memory data to a graphics card, but if a CPU board is put along side the graphics board then the appropriate connection will not be made because the graphics board will not have a communication link at the appropriate defined position or coordinate.

FIGS. 1A and 1B illustrate the fixed coordinates of the optical connectors in a flat plane along the edge of a card but other orientations can also be used. In some embodiments, the fixed coordinates of the source optical connectors vary in an x-coordinate and/or a y-coordinate on an x-y plane of a computing blade when the computing blade is vertically oriented. In some embodiments, this means the optical connectors can extend perpendicularly from the plane of the card. In another embodiment, the optical connectors can be arranged to have fixed positions in the z-coordinate space with respect to the computing blade.

Figure 2A:
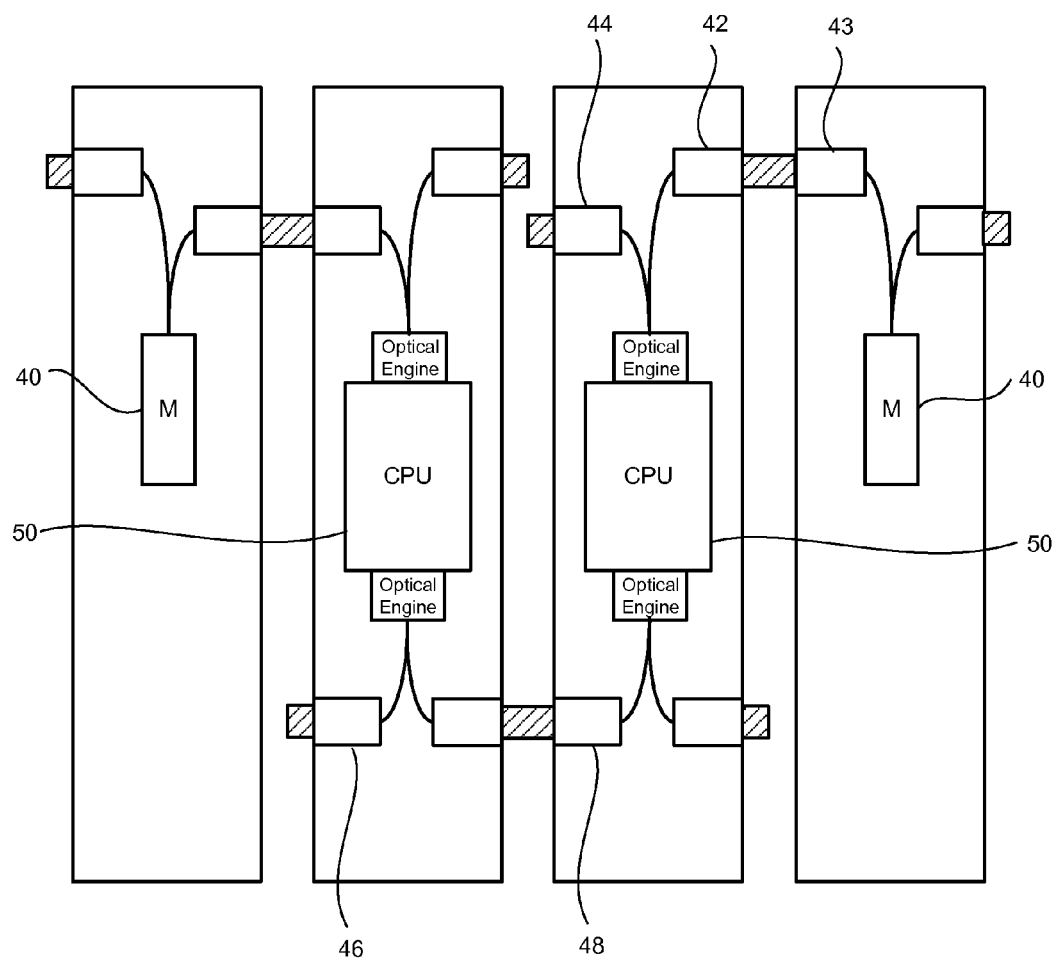
FIG. 2A illustrates a plurality of CPU boards connected to memory boards in an embodiment.

FIG. 2A is an example illustration of interconnects that can be used for optical communication. While an example of horizontally oriented printed circuit boards and optical connectors is illustrated in FIG. 2A, the computing boards can also be oriented vertically in a blade configuration, where an interconnect is on one side of a blade plane and the other interconnect is on the other side of the blade plane.

FIG. 2A further illustrates that CPUs 50 on the computing boards can be configured to make connections with memory modules 40 on adjacent boards. The defined position of the memory optical connector 42 on the CPU board will align with the CPU connector of the memory board 43. As can be seen, the memory connector 44 on the opposite side of the CPU card will not align with the CPU card to its left because the CPU board does not have a memory connection at this location. This configuration allows a simultaneous optical signal to be delivered to both memory optical connectors but when a first coupling is made the other remaining coupling is not used. In addition, the two CPU boards may have optical interconnects that have defined locations for CPU to CPU connections 48. Such CPU to CPU connections 46 will not create a connection with the memory card or another board that does not match with the same defined CPU connection coordinate.

One result of the present technique is that one good optical communication connection can be made, while undesirable optical connections are avoided. If the optical connectors were not located at defined coordinates for: 1) the connection type and 2) the side of the board, then undesirable connections might be made with connectors of the incorrect communication type. The connector offsets and coordinate locations avoid the problem of an inadvertent or undesirable connection.

Figure 2B:
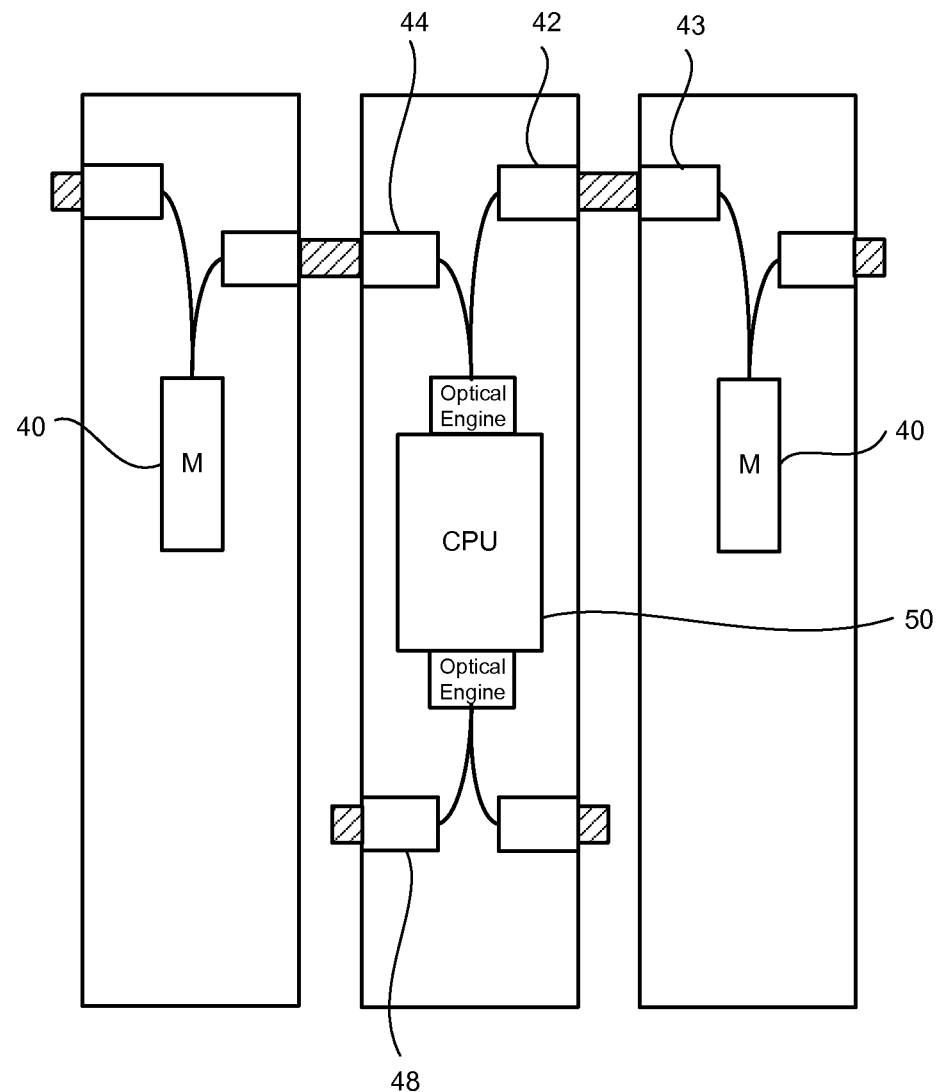
FIG. 2B illustrates one CPU board connected to two memory boards in an embodiment.

FIG. 2B illustrates an example of a single CPU that can be connected to two memory boards using the same connector configurations as FIG. 2A. However, in FIG. 2B the CPU to CPU interconnects do not align with any other connectors and are thus not used.

Figure 2C:
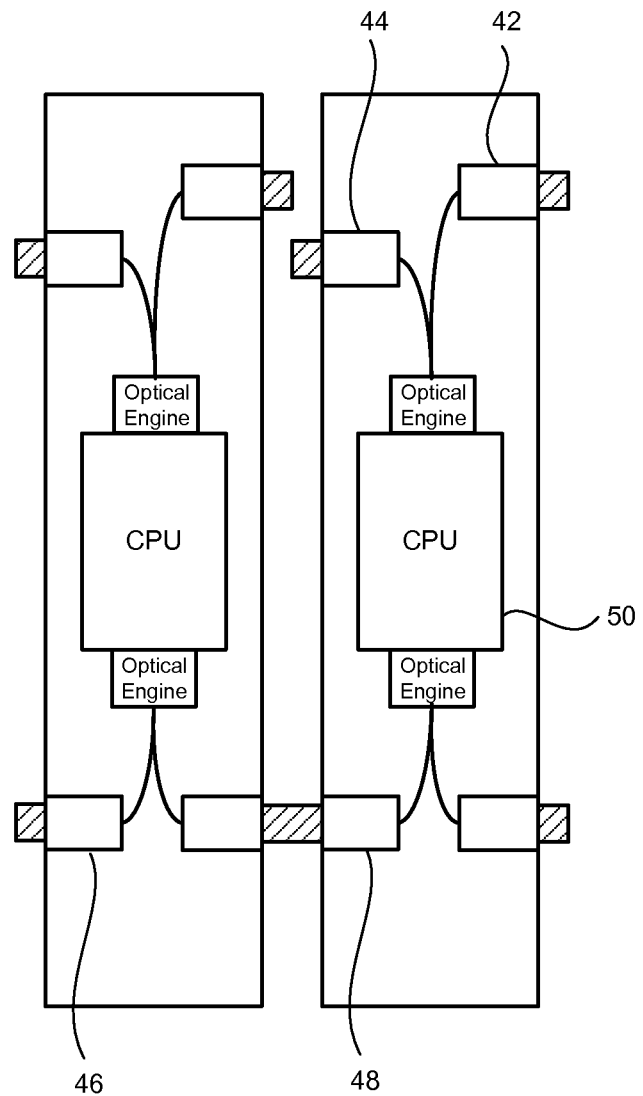
FIG. 2C illustrates two CPU boards connected together in an embodiment.

FIG. 2C illustrates an exemplary configuration where 2 CPUs are coupled together without any communication to memory boards. The memory connectors 42, 44 do not align with the connectors on the CPU boards and so a memory connection is not made. FIGS. 2A-2C illustrate that many configurations can be created using several basic connector configurations and this provides flexibility for configuring blades in a chassis.

These configurations are possible because the optical engine provides enough light energy for two or more optical connectors with a useful signal. Using defined coordinates to passively route the appropriate signals avoids active electronic routing and the remaining signal in the unused connector is discarded or unused.

A connector on a computing board may be dedicated to a specific type of traffic, such as CPU-memory traffic, memory-CPU traffic, component to I/O, CPU to CPU traffic, or other connections. Each optical connector location or coordinate on the side of the computing board can be dedicated to a predetermined type of computing component or predetermined type of traffic. As a result, the optical connector may be placed in a specified physical location or fixed coordinate position relative to other connectors on a computing board. The physical location of the connector for the predetermined type of traffic can remain constant for a specified board and/or communication type.

For example, a CPU-memory connector may be located on every CPU board at the same coordinate location. The location of a connector on one side of a board may be the same or different location as compared to a connector location on the opposite side of the board for the same optical signal. Defining a connector position or coordinate for a specified traffic type on a computing board allows the components on a computing board to passively guide optical signals to matching component types on other computing boards by utilizing the specified traffic connection without adding electronic switching, electronic protocol conversions and similar costly functions. Using coordinate positioning and offsets allows optical connectors of a predetermined type to align with optical connectors of the same type on a different computing board, as long as the optical connectors are in fixed predetermined positions for the traffic type between the computing boards.

FIG. 2D is a table illustrating that once a connector is used on one side of the board, the opposing connector with the same signal is configured not to be used on the other side of the board. This is due to coordinate positioning and offsets of the optical connectors. In addition, each of the connection types may be defined as having its own coordinate area or separate real estate across all the boards that is exclusive to the connection type.

Figure 3:
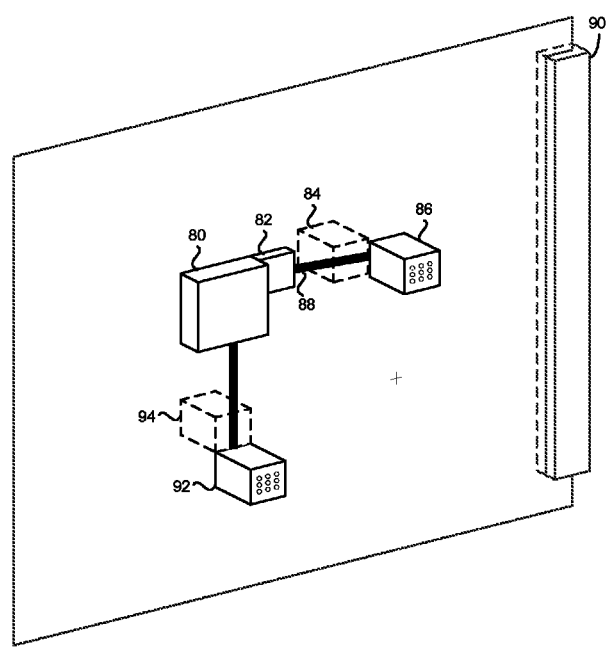
FIG. 3 is a perspective view of optical connections for a CPU on a blade in an embodiment.

FIG. 3 illustrates a perspective view of a blade or computing board that has a plurality of optical connectors and an electrical backplane connection 90. These optical connectors can be provided for a CPU (Central Processing Unit) 80 or some other electronic device that communicates using an optical connection. An optical engine 82 for the CPU can send optical signals via optical conduits 88 to two or more optical connectors 84 and 86. These optical conduits carry the same signals due to the use of the optical splitter associated with the optical engine. These connectors can connect to other blades or boards as previously illustrated. These connectors 84, 86 can be considered as having offsets from each other in the x-coordinate direction and connectors with offsets from each other in the y-coordinate direction 92, 94 have also been illustrated.

While the present system and method will be described primarily with CPU, memory, I/O, or similar connections, a multitude of other types of communication channels are also possible. For example, the central board may be an I/O hub and the board types that may be connected to the central board can include a Fiber Channel board, an Infiniband board, an Ethernet board or another type of communication channel. Accordingly, a variety of other communication channel configurations can be used where adjacent blades or boards are desired to communicate directly with each other.

Figure 4:
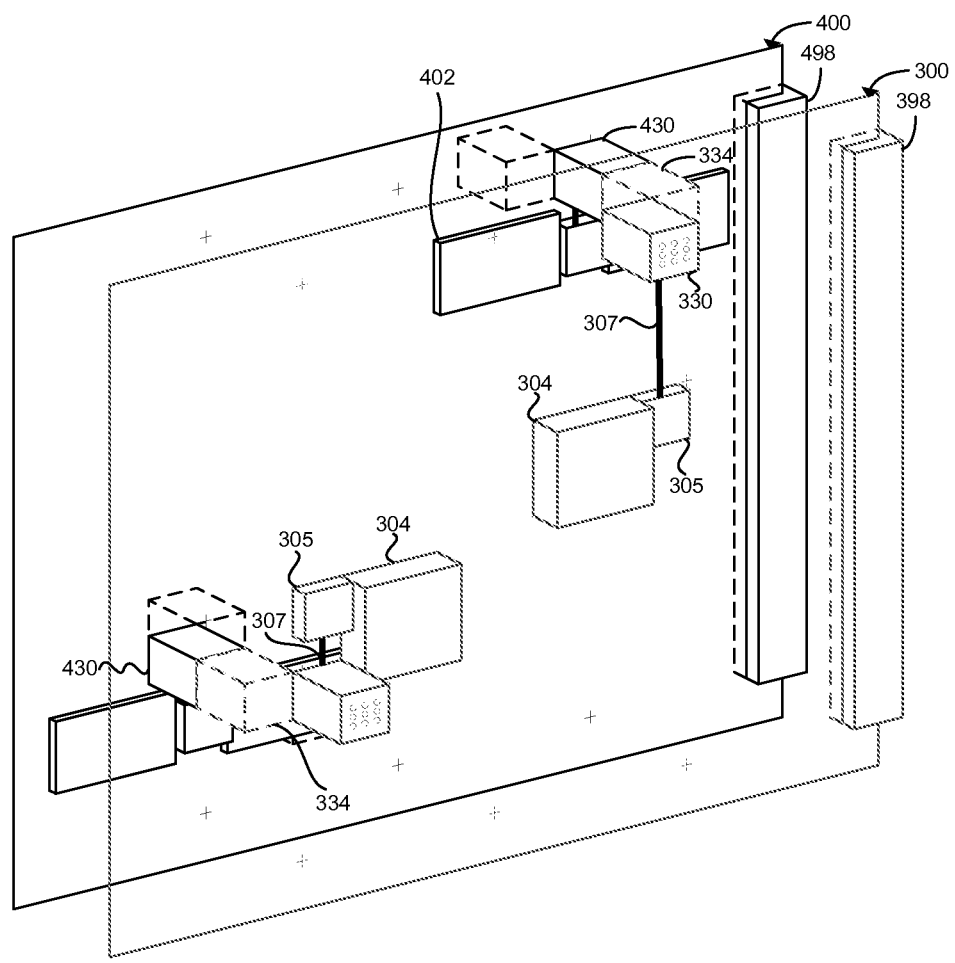
FIG. 4 is a perspective view illustrating a CPU board adjacent to a memory board with fixed connector coordinates in accordance with an embodiment.

Additional detailed embodiments will now be described. Printed circuit boards (PCBs) 300 and 400, which are often referred to as computing boards or blades, may include electrical and optical devices 304 that perform general computing functions or specific computing functions, as illustrated in FIG. 4. Devices or computing components on the computing board may be a central processing unit (CPU) 304, an input and/or output (I/O) device, memory 402, or other specialized circuits. The components on the blades may be coupled to each other by electrical traces, cabling, or optical channels within or on the surface of the blade.

The electrical and optical devices may be coupled to electrical and optical devices on nearby computing boards using a board backplane connector 398 and 498 on an edge of the computing board, or an optical connector 334 that couples to a mating connector 430 on an adjacent computing board. The board backplane connector can provide electrical or optical coupling with other circuits using the connection and circuitry of a computer chassis.

The optical connector 334 on a first blade 300 is positioned to align with a mating connector 430 on a second blade 400, so an optical or electrical connection is made between components on adjacent blades when both blades are seated in a chassis. The optical connectors can receive optical signals from an optical engine 305 in communication with a computing component 304. The optical signals can be transmitted over an optical conduit 307. Multiple connectors 334 of a first blade may align with multiple corresponding or mating connectors 430 of a second blade. Connectors 334 and 330 of a first blade may be positioned on both sides of a blade, so the connectors on a first side of the first blade may align with connectors on a second blade or alternatively, the connectors on a second side of the first blade may align with connectors on a third blade, etc. Connectors and components on a front side of a blade are shown in FIG. 4 with solid lines and connectors and components on a back side of a blade are shown with dashed lines. The optical connectors can receive optical signals from an optical engine and splitter.

The computing boards may have separate specific functions. For example, the specific function may involve central processing, input or output processing, or memory storage. A blade with a CPU, a plurality of CPUs, or a blade with the primary purpose of central processing may be referred to as a CPU blade. A blade with an I/O chip, a plurality of I/O chips, or a blade with the primary purpose of input and/or output processing may be referred to as an I/O blade. A blade with a memory chip, a plurality of memory chips, or a blade with the primary purpose of memory storage may be referred to as a memory blade.

Figure 5:
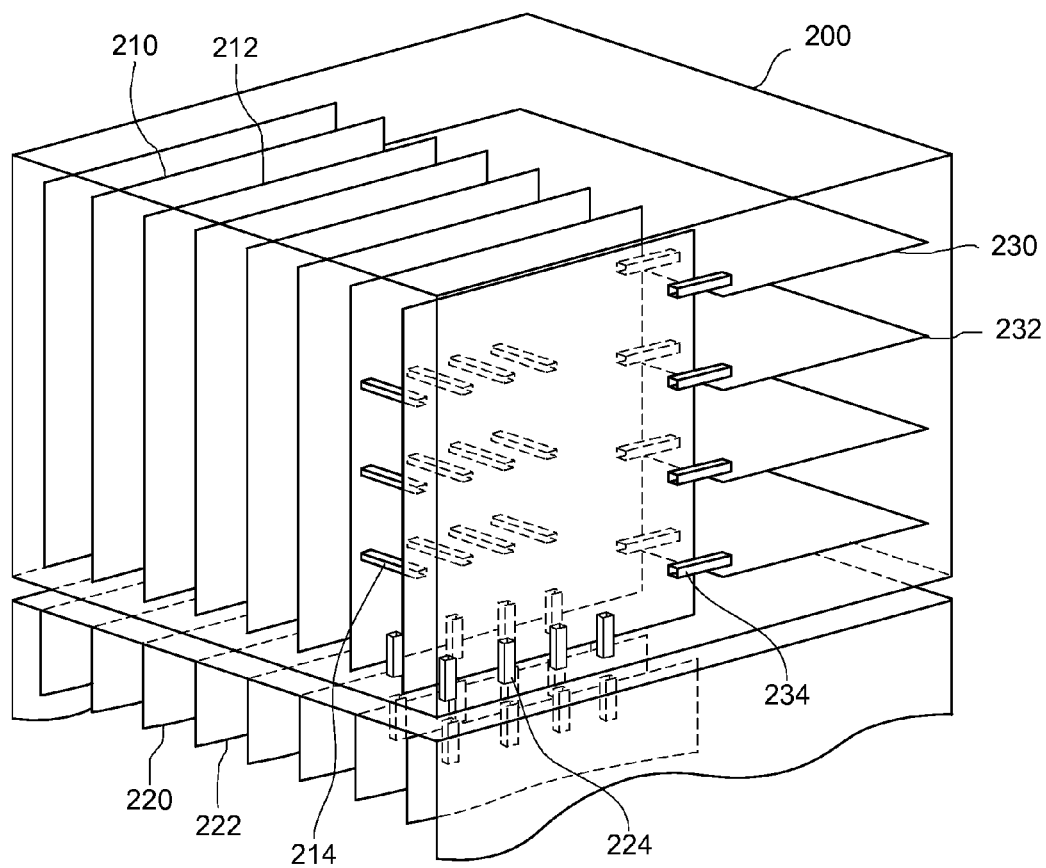
FIG. 5 is a perspective view illustrating printed circuit boards coupled on a chassis in accordance with an embodiment.

Computing boards may be stacked in a cabinet or computer chassis which can provide a uniform distance between computing boards using a frame. The computing boards may be attached to a chassis 200 in a horizontal 230 and 232 or vertical 210, 212, 220, and 222 configuration, as shown in FIG. 5. Support or attachment of the blade to the chassis may be provided by sheet metal slots or notches in the chassis. In addition, the electrical or optical connectors on an edge of the blade may also provide a nominal amount a retention force with respect the other blades and the chassis. The supports may be used to provide stability and uniform distance between blades in a chassis or to attach blades together. The blades may be parallel to each other. The insertion of a blade can place the face of a connector within the proximity of the face a corresponding connector positioned on an adjacent blade in the chassis, so the connector and corresponding connector may provide electrical or optical alignment when both blades are seated in the chassis. The connector 214 may be normal to the face of the blades or the connector 224 and 234 may be normal to an edge of the blades. Connectors may provide board-to-board, blade-to-blade, or inter-chip communication.

As shown in FIG. 4, the first connector 334 and a (second) mating connector 430 may self-align with the insertion of the first computing board and the second computing board into a computing chassis. The first connector and mating (second) connector may be a connector as disclosed in commonly owned U.S. provisional patent application Ser. No. 61/085,331 filed Jul. 31, 2008, entitled "Self-Aligning Proximity Connector and Methods for Aligning," which is hereby incorporated by reference in its entirety. Of course other physical connection types may be used such as press fit connectors, interlocking connectors, or other known connectors.

A first component may optically couple to a second component using an optical engine in close proximity to the first component to transmit an optical signal from the first component to the second component. For example, FIGS. 6A-6E illustrate an optical engine 610 for a memory component 602-608 on a memory board 600. Connectors or interconnects may be used in the optical coupling between the first component and the second component. The connectors may allow a first component and a second component to be on adjacent computing boards and be able to communicate through connectors. A first connector 634 coupled to the first component may have a corresponding connector, mating connector, or second connector coupled to the second component.

Referring again to FIG. 6, optical engines 610 may have power to generate photonic or optical signals for multiple optical connectors using optical splitting. The optical engine may be integrated into the circuitry or packaging of a component 602-608. The optical engine 610 may provide optical signals for more than one component 602. The optical engine for a component may generate optical signals to connectors not coupled to a mating connector. The additional photonic energy of the non-coupled or non-connected connector may be considered wasted because the connector is not used to couple components together. The additional power of the optical engines allows substantially similar optical signals to be sent to both coupled and uncoupled connectors.

Grouping signals or channels together from a specific type of component to another type of component enables communication traffic to flow between two components. The path of the communications traffic or optical signals from one type of component or another type of component may be the routing of the traffic using the connectors. For example, a first component may be a CPU and a second component may be memory. In this case, the traffic may be CPU-memory traffic. The traffic also may flow from the second component (memory) to a first component (CPU) forming memory-CPU traffic.

A first connector coupled to the CPU and a mating connector coupled to the memory may provide a CPU-memory connection. The connector may allow a plurality of traffic streams to pass through the same connector. Part of the CPU-memory connector may route CPU-memory traffic and part of the connector may route memory-CPU traffic. Alternatively, a component may use a separate connector to route each type of traffic. Data traffic may be routed on either side (plane) of a computing board. For example, if a first component is a CPU and a second component is memory, a connector for CPU-memory traffic may be on a front side of a board and a memory-CPU traffic connection can be on a back side or vice versa.

The physical location of the connector for the predetermined type of traffic may remain constant for a specified board. For example, a CPU-memory connector may be located on every CPU board at the same location. The location of a connector on one side of a board may be the same or different from a connector on the opposite side of the board. Fixing a connector for a specified type of traffic on a computing board allows the component and computing board to pass optical signals to various types of computing boards utilizing the specified traffic. Using positioning and offsets allows a computing board of a predetermined type to generically align with another computing board of the same or different determined type, as long as the connectors for each computing board is in a fixed predetermined positions the type of traffic between the computing boards.

When a memory board is placed adjacent to a CPU board, only the CPU-memory connector will align with a mating CPU-memory connector on the memory board. All the other connectors on the CPU board and the memory board will misalign. This alignment facilitates the transfer of only CPU-memory traffic, memory-CPU traffic, or both. In other words, incompatible data channels are not able to communicate because they do not physically align. Passive alignment of connectors using fixed positions and offsets eliminates the need for duplicate light engines to be instantiated and for complex active electronic selection mechanisms to distinguish between compatible and incompatible communication ports or channels.

Figure 6A:
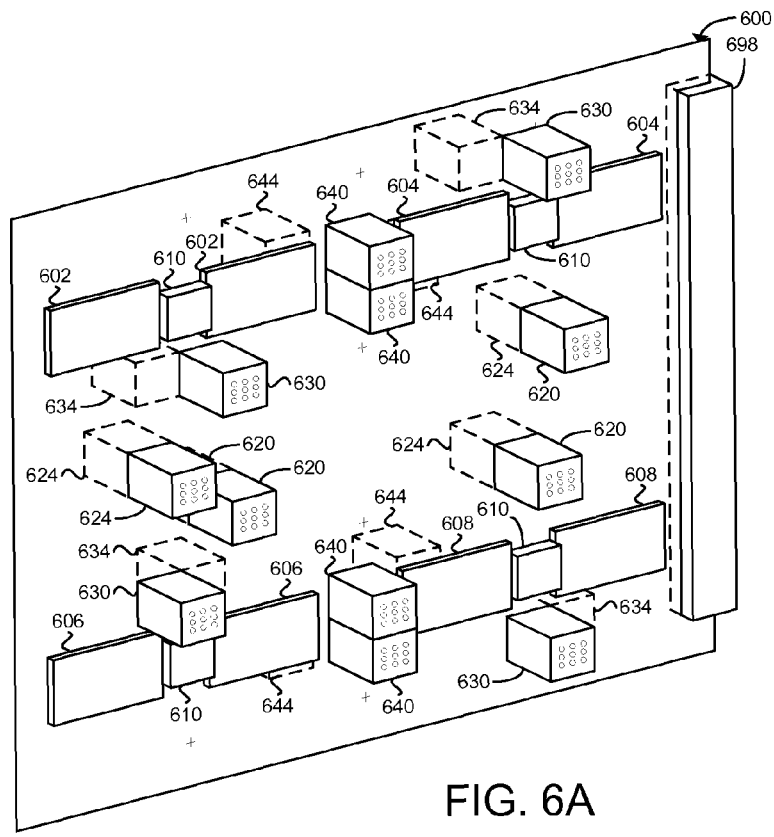
FIG. 6A is a perspective view illustrating a memory board with connectors for predetermined computing component types at fixed coordinates in accordance with an embodiment.
Figure 6B:
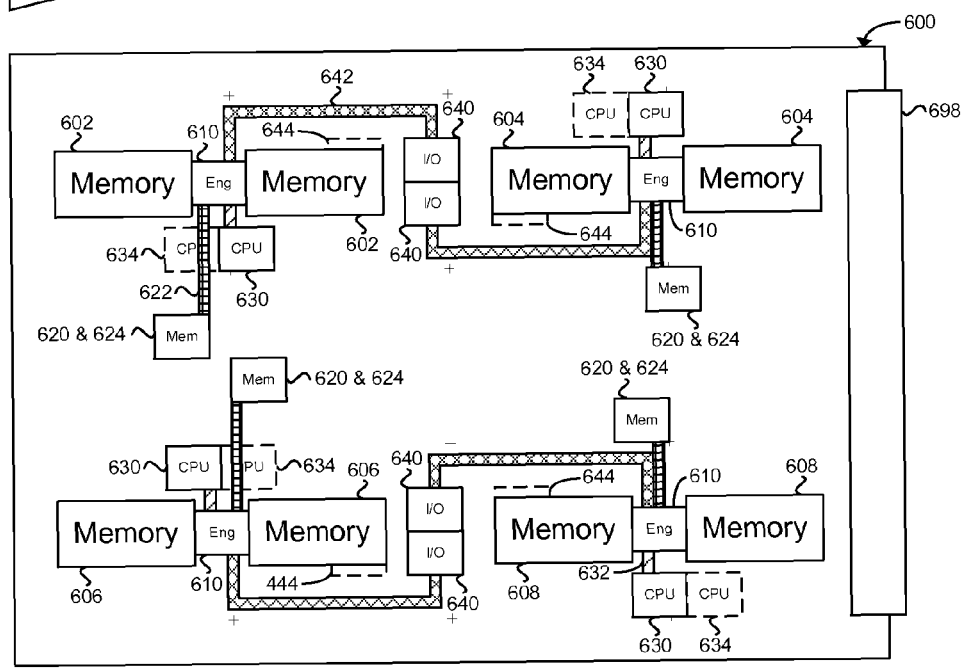
FIG. 6B is a side plane view illustrating a memory board with connectors for predetermined computing component types at fixed coordinates in accordance with an embodiment.
Figure 6C:
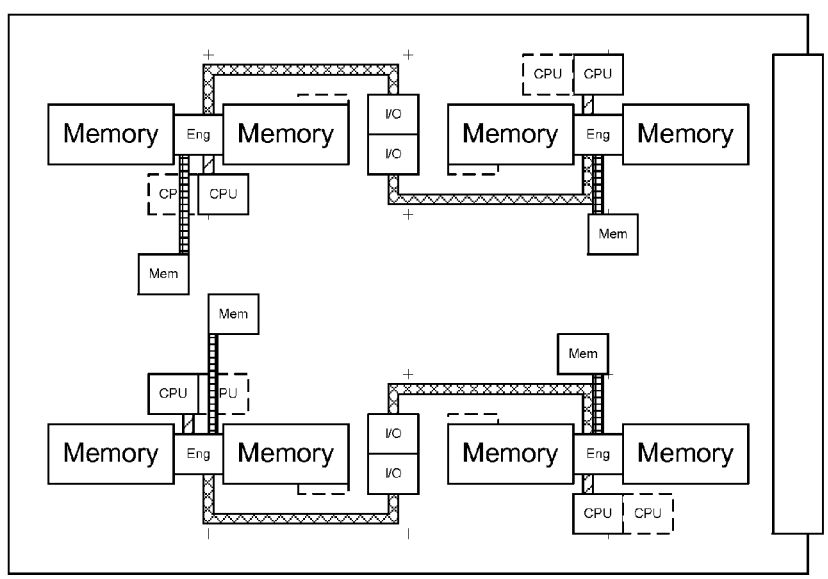
FIG. 6C is a side plane view illustrating a memory board with connectors for predetermined computing type components at fixed coordinates shown in relation to a side edge view and a top edge view in accordance with an embodiment.
Figure 6D:
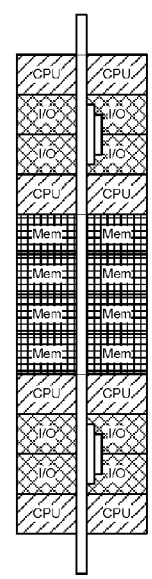
FIG. 6D is a side edge view illustrating a memory board with connectors for predetermined computing type components at fixed coordinates in accordance with an embodiment.
Figure 6E:
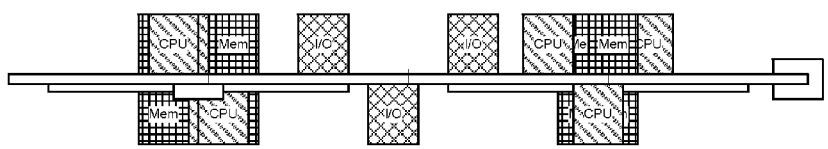
FIG. 6E is a top edge view illustrating a memory board with connectors for predetermined computing type components at fixed coordinates in accordance with an embodiment.

The memory modules 602-608 on a CPU board 600 may be configured to couple with other memory chips, CPUs, and/or I/O chips on an adjacent board, as shown in FIGS. 6A-6E. Although CPU, memory, and I/O circuit components are used for illustration, other computing components, connector types, or communication channels may also be used in combination with CPU, memory, and I/O electronic components. The optical engine 610 of the memory may be coupled to multiple connectors. The connectors may include a front-side CPU-memory connector 630, a front-side memory-I/O connector 640, a front-side memory-memory connector 620, a back-side CPU-memory connector 634, a back-side memory-I/O connector 644, and a back-side memory-memory connector 624. FIG. 6B illustrates an optical engine to memory-memory connector channel or path 622, an optical engine to memory-I/O connector channel or path 642, and an optical engine to CPU-memory connector channel or path 632 on a front-side of a CPU board are shown. The position and offset of connectors may vary in x-coordinate plane, the y-coordinate plane, or a z-coordinate plane that aligns with the plane of the computing board.

Figure 7:
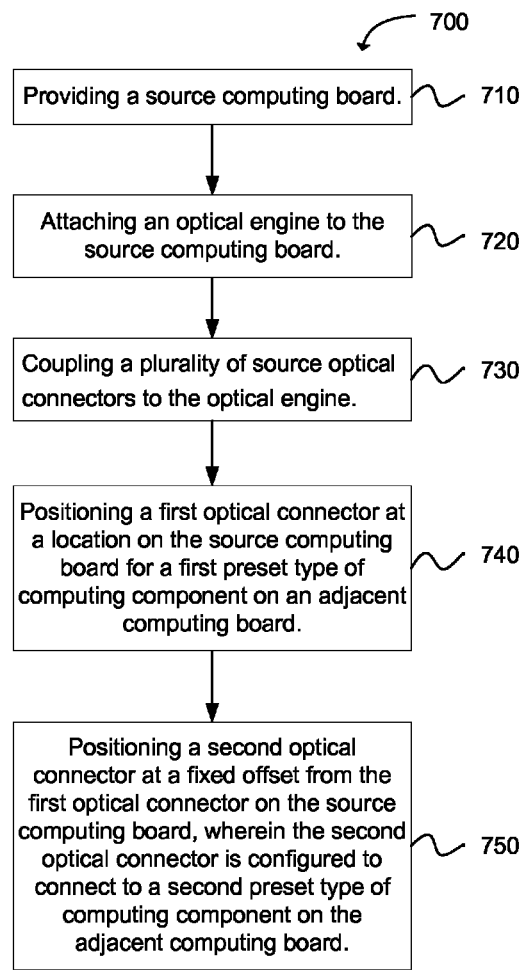
FIG. 7 is a flow chart illustrating a method for method for connecting adjacent computing board devices using connectors at fixed coordinate positions in accordance with an embodiment.

Another embodiment provides a method 700 for connecting adjacent computing board devices, as shown in the flow chart in FIG. 7. The method includes the operation of providing 710 a source computing board. The operation of attaching 720 an optical engine to the source computing board follows. The next operation of the method may be coupling 730 a plurality of source optical connectors to the optical engine.

The method 700 further includes positioning 740 a first optical connector at a location on the source computing board for a first preset type of computing component on an adjacent computing board. Then, the operation of positioning 750 a second optical connector at a fixed coordinate from the first optical connector on the source computing board can be performed. The second optical connector is configured to connect to a second preset type of computing component on the adjacent computing board.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for connecting adjacent computing board devices, comprising:
   providing a source computing board;
   attaching an optical engine having an optical splitter to the source computing board;
   interfacing a plurality of optical conduits to each simultaneously receive a same optical signal via the optical splitter;
   coupling a plurality of source optical connectors to the optical conduits;
   positioning a first optical connector at a location on the source computing board for a type of computing component on an adjacent computing board;
   positioning a second optical connector at a fixed offset from the first optical connector on the source computing board, wherein the second optical connector is configured to connect to a second preset the type of computing component on the adjacent computing board;
   coupling one source optical connector to another optical connector to provide a communication channel; and
   discarding the optical signal from the second source optical connector.

2. A method as in claim 1, further comprising inserting the source computing board into a computer chassis.

3. A method as in claim 2, further comprising optically aligning the first optical connector to a mating first optical connector for the type of computing component on the adjacent computer board with insertion of the adjacent computer board adjacent to the source computing board into the computer chassis.

4. A method as in claim 1, wherein positioning a first optical connector and second optical connector on computing boards a computer chassis for seating the adjacent computing board adjacent to the source computing board ensures proper connectivity between the first and second optical connector.

\* \* \* \* \*